(12) United States Patent
Park

(10) Patent No.: US 12,313,181 B2
(45) Date of Patent: May 27, 2025

(54) VALVE DEVICE HAVING ANTI-FREEZE FUNCTION

(71) Applicants: Hyundai Motor Company, Seoul (KR); Kia Corporation, Seoul (KR)

(72) Inventor: In Tae Park, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/974,236

(22) Filed: Oct. 26, 2022

(65) Prior Publication Data

US 2023/0392708 A1    Dec. 7, 2023

(30) Foreign Application Priority Data

Jun. 2, 2022 (KR) .................. 10-2022-0067523

(51) Int. Cl.
 *F16K 31/06* (2006.01)
 *F16K 7/16* (2006.01)
 *F16K 41/12* (2006.01)
 *H01M 8/04223* (2016.01)

(52) U.S. Cl.
 CPC ............ *F16K 31/0672* (2013.01); *F16K 7/16* (2013.01); *F16K 41/12* (2013.01); *H01M 8/04253* (2013.01)

(58) Field of Classification Search
 CPC .... F16K 1/38; F16K 31/0672; F16K 31/0655; F16K 41/10; F16K 41/103; F16K 41/12; F16K 41/125; F16K 7/12; F16K 7/16; F16K 25/005; F16K 27/12; H01M 8/04253

USPC ............................. 251/129.17, 129.18, 903
See application file for complete search history.

(56) References Cited

U.S. PATENT DOCUMENTS

| | | | | |
|---|---|---|---|---|
| 3,747,479 A * | 7/1973 | Nightingale | ............. | F16J 15/32 604/219 |
| 4,530,486 A * | 7/1985 | Rusnak | ............... | F16K 31/0668 137/881 |
| 4,634,096 A * | 1/1987 | Hara | ..................... | H01F 7/1607 251/50 |
| 5,139,227 A * | 8/1992 | Sumida | .................. | F02M 3/075 251/129.08 |
| 5,794,825 A * | 8/1998 | Gordon | ................. | F16K 41/003 277/647 |
| 5,992,822 A * | 11/1999 | Nakao | ................. | F16K 31/0655 335/262 |
| 6,006,728 A * | 12/1999 | Matsuda | ................ | F02M 69/10 123/472 |

(Continued)

*Primary Examiner* — Kevin F Murphy
*Assistant Examiner* — Jonathan J Waddy
(74) *Attorney, Agent, or Firm* — Fish & Richardson P.C.

(57) ABSTRACT

The present disclosure relates to a valve device including a valve base having a discharge flow path through which a target fluid is discharged, a plunger configured to be rectilinearly movable from a first position at which the plunger closes the discharge flow path to a second position at which the plunger opens the discharge flow path, a solenoid configured to provide driving power for moving the plunger, and an anti-freezing member connected to the plunger and configured to prevent freezing of the target fluid in the discharge flow path by moving in the discharge flow path in conjunction with a movement of the plunger, thereby obtaining an advantageous effect of preventing the discharge flow path through which the target fluid is discharged from being clogged, and of improving safety and reliability.

11 Claims, 12 Drawing Sheets

(56) References Cited

U.S. PATENT DOCUMENTS

| | | | |
|---|---|---|---|
| 6,220,275 B1* | 4/2001 | Nishinosono | F16K 31/0606 251/129.08 |
| 6,293,514 B1* | 9/2001 | Pechoux | F16K 1/52 251/129.08 |
| 7,007,917 B2* | 3/2006 | Choi | F16K 31/0655 251/129.21 |
| 9,022,349 B2* | 5/2015 | Tung | F16K 1/42 251/366 |
| 2013/0146795 A1* | 6/2013 | Lang | F16K 31/0655 251/318 |
| 2017/0152968 A1* | 6/2017 | Raj | H01J 37/32477 |
| 2020/0003321 A1* | 1/2020 | Xu | F16K 31/0672 |

* cited by examiner

VALVE DEVICE HAVING ANTI-FREEZE FUNCTION

CROSS-REFERENCE TO RELATED APPLICATION

This application claims priority to and the benefit of Korean Patent Application No. 10-2022-0067523 filed in the Korean Intellectual Property Office on Jun. 2, 2022, the entire contents of which are incorporated herein by reference.

TECHNICAL FIELD

The present disclosure relates to a valve device, and more particularly, to a valve device capable of preventing a discharge flow path through which a target fluid is discharged from being clogged, and of improving safety and reliability.

BACKGROUND ART

A fuel cell electric vehicle (FCEV) can produce electrical energy from an electrochemical reaction between oxygen and hydrogen in a fuel cell stack and uses the electrical energy as a power source.

The fuel cell electric vehicle may continuously generate electricity, regardless of a capacity of a battery, by being supplied with fuel and air from the outside, and thus has high efficiency, and emits almost no contaminant. By virtue of these advantages, among others, continuous research and development is being conducted on the fuel cell electric vehicle.

A plurality of hydrogen tanks is typically provided in the fuel cell electric vehicle, and hydrogen is stored in the hydrogen tanks along a hydrogen charging line of a hydrogen storage system. The hydrogen stored in the hydrogen tanks can be depressurized by a regulator, supplied to the fuel cell stack along a hydrogen supply line, and then used to produce electrical energy.

In some cases, discharge water (condensate water) and exhaust gas, which are produced during the operation of the fuel cell stack, may be discharged to the outside through a discharge flow path (e.g., a discharge flow path of a water trap that traps condensate water contained in unreacted hydrogen). The discharge flow path may be selectively opened or closed by a discharge valve (e.g., a solenoid valve).

However, in some cases, the discharge water remaining in the discharge flow path may become frozen in the discharge flow path because of a low temperature in the winter season, without being discharged to the outside through the discharge flow path. Further, there can be a problem in that the frozen discharge water clogs the discharge flow path, which makes it difficult to discharge the discharge water in a timely manner.

SUMMARY

The present disclosure has been made in an effort to provide a valve device that may prevent a discharge flow path from being clogged and improve safety and reliability.

In particular, the present disclosure has been made in an effort to help prevent a discharge flow path from being clogged by frozen discharge water and discharge, in a timely manner, the discharge water and exhaust gas generated from a fuel cell stack regardless of an outside temperature.

The present disclosure has also been made in an effort to open a discharge flow path and solve a problem with freezing of the discharge flow path.

The present disclosure has also been made in an effort to simplify a structure and a manufacturing process and reduce costs.

The present disclosure has also been made in an effort to effectively solve a problem of a clogged discharge flow path without using a separate defrosting means (e.g., a heating means) and a separate power source.

The present disclosure has also been made in an effort to contribute to miniaturization of a product and improve spatial utilization and a degree of design freedom.

The objects to be achieved by the implementations are not limited to the above-mentioned objects, but also include objects or effects that may be understood from the solutions or implementations described below.

An exemplary implementation of the present disclosure provides a valve device including: a valve base having a discharge flow path through which a target fluid is discharged; a plunger configured to be rectilinearly movable from a first position at which the plunger closes the discharge flow path to a second position at which the plunger opens the discharge flow path; a solenoid configured to provide driving power for moving the plunger; and an anti-freezing member connected to the plunger and configured to prevent freezing of the target fluid in the discharge flow path by moving in the discharge flow path in conjunction with a movement of the plunger.

This can help prevent the discharge flow path from being clogged, and improve safety and reliability.

That is, discharge water (condensate water) and exhaust gas, which are produced during the operation of the fuel cell stack, need to be discharged to the outside through the discharge flow path. However, there can be a problem in that the discharge water remaining in the discharge flow path is frozen in the discharge flow path because of a low temperature in the winter season, without being discharged to the outside through the discharge flow path. Further, there can be a problem in that the frozen discharge water clogs the discharge flow path, which makes it difficult to discharge the discharge water in a timely manner.

In contrast, according to the implementation of the present disclosure, the anti-freezing member may move in the discharge flow path in conjunction with the movement of the plunger. Therefore, it is possible to obtain an advantageous effect of preventing the discharge flow path from being clogged by the frozen target fluid (e.g., condensate water) and obtain an advantageous effect of preventing a situation in which the target fluid cannot be discharged.

Among other things, according to the implementation of the present disclosure, it is possible to obtain an advantageous effect of effectively solving a problem of the clogged discharge flow path without using a separate defrosting means (e.g., a heating means) and a separate power source in order to solve the problem that the discharge flow path is clogged by the frozen target fluid.

According to the exemplary implementation of the present disclosure, when the plunger is positioned at the first position, the anti-freezing member may be disposed in the discharge flow path, and when the plunger is moved from the first position to the second position, at least a part of the anti-freezing member may be extended to the outside of the discharge flow path, and a passing flow path through which the condensate water is capable of passing may be provided in the discharge flow path.

The anti-freezing member may have various sizes that enable the anti-freezing member to move in the discharge flow path in conjunction with the movement of the plunger.

According to the exemplary implementation of the present disclosure, the discharge flow path may have a first length, the anti-freezing member may have a second length equal to or longer than the first length, and an end of the anti-freezing member may be exposed to the outside of the discharge flow path when the plunger is moved to the first position.

As described above, the anti-freezing member may have a length equal to or longer than the length of the discharge flow path, and the end of the anti-freezing member may be exposed to the outside of the discharge flow path. Therefore, two opposite ends of a space in which the anti-freezing member is positioned may be kept open even though the condensate water remaining in the discharge flow path is frozen, which makes it possible to prevent the entire discharge flow path from being clogged by the ice.

The anti-freezing member may have various structures capable of defining the passing flow path in the discharge flow path.

According to the exemplary implementation of the present disclosure, a proximal end of the anti-freezing member adjacent to the plunger may have a first cross-sectional area, and a distal end of the anti-freezing member may have a second cross-sectional area different from the first cross-sectional area.

For example, the anti-freezing member may have a cross-sectional area that gradually decreases in a direction from the proximal end to the distal end.

Alternatively, the anti-freezing member may have a cross-sectional area that gradually increases in a direction from the proximal end to the distal end.

According to the exemplary implementation of the present disclosure, the valve device may include a hydrophobic coating layer provided on an outer surface of the anti-freezing member.

As described above, the hydrophobic treatment may be performed on the outer surface of the anti-freezing member that comes into contact with the ice. Therefore, it is possible to obtain an advantageous effect of minimizing a situation in which the ice is attached to the outer surface of the anti-freezing member. Further, it is possible to obtain an advantageous effect of more easily separating the anti-freezing member from the ice.

According to the exemplary implementation of the present disclosure, the valve device may include a protrusion pattern provided on an inner wall surface of the discharge flow path.

As described above, in the implementation of the present disclosure, the protrusion pattern may be provided on the inner wall surface of the discharge flow path, such that the ice may be locked to the inner wall surface of the discharge flow path.

Therefore, it is possible to obtain an advantageous effect of preventing the ice frozen in the discharge flow path from being attached to the anti-freezing member and moved together with the anti-freezing member when the anti-freezing member is extended to the outside of the discharge flow path in conjunction with the movement of the plunger.

According to the exemplary implementation of the present disclosure, the valve device may include a diaphragm provided between the plunger and the discharge flow path.

Because the diaphragm is provided between the plunger and the discharge flow path as described above, it is possible to obtain an advantageous effect of improving sealability implemented by the plunger.

According to the exemplary implementation of the present disclosure, the diaphragm may have a through-hole, and one end of the anti-freezing member may be connected to the plunger through the through-hole.

According to the exemplary implementation of the present disclosure, the valve device may include: a sealing protrusion configured to surround the through-hole and provided on an outer surface of the diaphragm that faces the discharge flow path; and a protrusion accommodation portion provided on the anti-freezing member and configured to accommodate the sealing protrusion.

Because the sealing protrusion is accommodated in the protrusion accommodation portion as described above, it is possible to obtain an advantageous effect of more effectively preventing a leak of the condensate water through a gap between the through-hole and the anti-freezing member.

The valve device according to the exemplary implementation of the present disclosure may include an ice crushing portion connected to the distal end of the anti-freezing member and having a cross-sectional area different from the second cross-sectional area (the cross-sectional area of the distal end of the anti-freezing member).

In this case, the configuration in which the ice crushing portion has the cross-sectional area different from the cross-sectional area of the distal end of the anti-freezing member includes both a case in which the cross-sectional area of the ice crushing portion is larger than the cross-sectional area of the distal end of the anti-freezing member and a case in which the cross-sectional area of the ice crushing portion is smaller than the cross-sectional area of the distal end of the anti-freezing member.

Because the ice crushing portion is provided at the end of the anti-freezing member as described above, the ice frozen in the discharge flow path may be crushed when the anti-freezing member and the ice crushing portion move in conjunction with the rectilinear movement of the plunger. Therefore, it is possible to define the passing flow path further enlarged in the discharge flow path.

According to the exemplary implementation of the present disclosure, the valve device may include a diaphragm cover integrated with the diaphragm and configured to surround an entire outer surface of the anti-freezing member.

Because the diaphragm cover is provided to surround the outer surface of the anti-freezing member as described above, it is possible to minimize a situation in which the ice is attached to the outer surface of the anti-freezing member. Therefore, it is possible to obtain an advantageous effect of easily separating the anti-freezing member from the ice.

According to the exemplary implementation of the present disclosure, the valve device may include a cover hydrophobic coating layer provided on an outer surface of the diaphragm cover.

As described above, the cover hydrophobic coating layer may be provided on the outer surface of the diaphragm cover that comes into contact with the ice. Therefore, it is possible to obtain an advantageous effect of more effectively preventing the ice from being attached to the outer surface of the diaphragm cover, and of more easily separating the anti-freezing member from the ice.

According to the exemplary implementation of the present disclosure, the anti-freezing member may be integrated with an end of the plunger so that the anti-freezing member and the plunger define a unitary one-piece structure.

The solenoid may have various structures capable of providing driving power for rectilinearly moving the plunger.

For example, the solenoid may include: a bobbin around which a coil is wound; a yoke disposed in the bobbin and configured to accommodate the plunger such that the plunger is rectilinearly movable; and an elastic member configured to elastically support a rectilinear movement of the plunger relative to the bobbin.

According to the exemplary implementation of the present disclosure, the valve device may include a core disposed in the bobbin and facing an end of the plunger.

As described above, in the implementation of the present disclosure, the core may be provided at the end of the plunger. Therefore, when power is applied to the coil, an additional magnetic field for moving the plunger to the second position may be formed by the core. Therefore, it is possible to increase the magnetic field for moving the plunger and ensure a smoother operation of the plunger without increasing a size of the solenoid.

In particular, the valve device may include an inclined recess provided at an end of the core that faces the plunger.

As described above, in the implementation of the present disclosure, the inclined recess may be provided at the end of the core that faces the plunger. Therefore, when the plunger initially moves from the first position at which the plunger closes the discharge flow path (a state in which the plunger is maximally spaced apart from the core) to the second position, a largest magnetic field (magnetic force) may be applied to the plunger.

DETAILED DESCRIPTION

Figure 1:
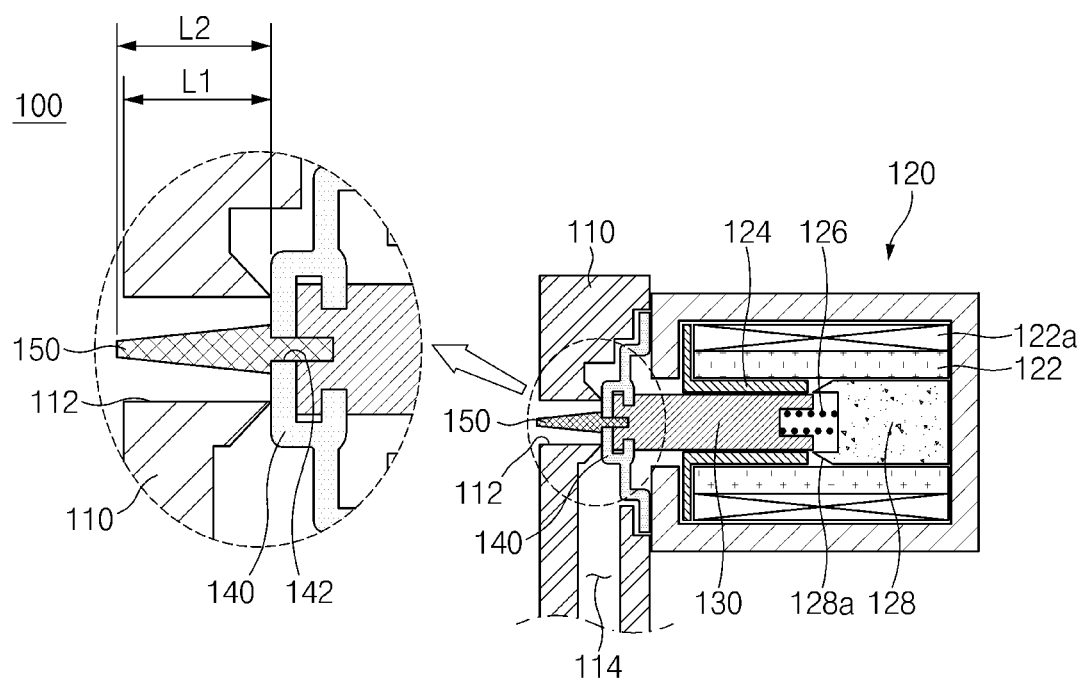
FIG. 1 is a cross-sectional view showing an example valve device according to an implementation of the present disclosure.

Hereinafter, exemplary implementations of the present disclosure will be described in detail with reference to the accompanying drawings.

However, the technical spirit of the present disclosure is not limited to some implementations described herein but may be implemented in various different forms. One or more of the constituent elements in the implementations may be selectively combined and substituted for use within the scope of the technical spirit of the present disclosure.

Referring to FIGS. 1 to 11, a valve device 100 according to an implementation of the present disclosure includes: a valve base 110 having a discharge flow path 112 through which a target fluid is discharged; a plunger 130 configured to be rectilinearly movable from a first position at which the plunger 130 closes the discharge flow path 112 to a second position at which the plunger 130 opens the discharge flow path 112; a solenoid 120 configured to provide driving power for moving the plunger 130; and an anti-freezing member 150 connected to the plunger 130 and configured to prevent freezing of the target fluid in the discharge flow path 112 by moving in the discharge flow path 112 in conjunction with a movement of the plunger 130.

For reference, the valve device 100 according to the implementation of the present disclosure may be applied to various objects in accordance with required conditions and design specifications. The present disclosure is not restricted or limited by the type and structure of the object to which the valve device 100 is applied.

Hereinafter, an example will be described in which the valve device 100 according to the implementation of the present disclosure is applied to a water trap that traps condensate water (or exhaust gas, i.e., a target fluid) contained in unreacted hydrogen ($H_2$+water) discharged from a fuel cell stack. According to another implementation of the present disclosure, the valve device may be mounted directly on the fuel cell stack or applied to other target fluid storage devices.

The valve base 110 may have various structures having the discharge flow path 112 through which the target fluid (condensate water) may be discharged. The present disclosure is not restricted or limited by the structure and shape of the valve base 110.

For example, the valve base 110 may define a part of a water trap main body (may be integrated with the water trap main body). According to another implementation of the present disclosure, the valve base may be provided separately from the water trap main body and attached or coupled to an outer surface of the water trap main body.

The discharge flow path 112 may have various structures capable of discharging the target fluid (condensate water). For example, the discharge flow path 112 may be provided in the form of a circular hole having an approximately circular cross-section.

In addition, the valve base 110 may have an outlet flow path 114 that communicates with the discharge flow path 112. When the discharge flow path 112 is opened, the condensate water discharged through the discharge flow path 112 may be discharged to the outside through the outlet flow path 114.

The plunger 130 is configured to selectively open or close the discharge flow path 112.

More specifically, the plunger 130 is configured to rectilinearly move from the first position at which the plunger 130 closes the discharge flow path 112 by being moved by the solenoid 120 to the second position at which the plunger 130 opens the discharge flow path 112.

The plunger 130 may have various structures capable of rectilinearly moving from the first position at which the plunger 130 closes the discharge flow path 112 to the second position at which the plunger 130 opens the discharge flow path 112. The present disclosure is not restricted or limited by the structure and shape of the plunger 130.

For example, the plunger 130 may have an approximately cylindrical shape. The plunger 130 may selectively open or close the discharge flow path 112 by rectilinearly moving in directions toward and away from the discharge flow path 112 (in a longitudinal direction of the discharge flow path).

Figure 2:
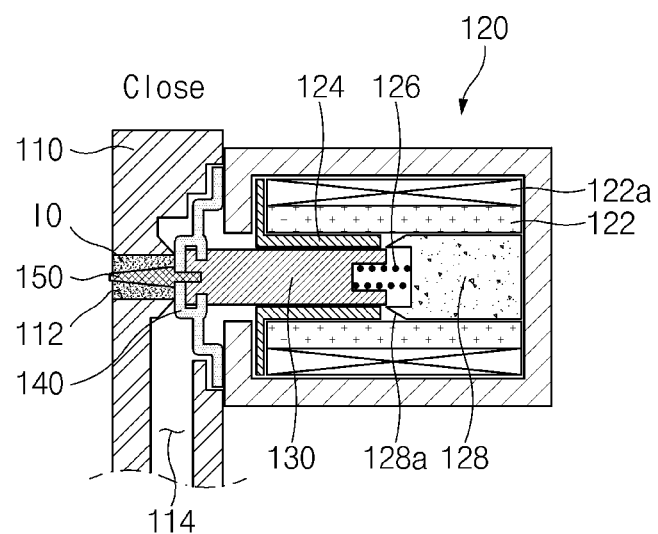
FIG. 2 is a cross-sectional view illustrating an example state in which a plunger is moved to a first position in the valve device according to the implementation of the present disclosure.

For example, referring to FIG. 2, when the plunger 130 moves to the first position (in a leftward direction based on FIG. 2), the plunger 130 may come into close contact with an end of the discharge flow path 112 and close the discharge flow path 112.

Figure 3:
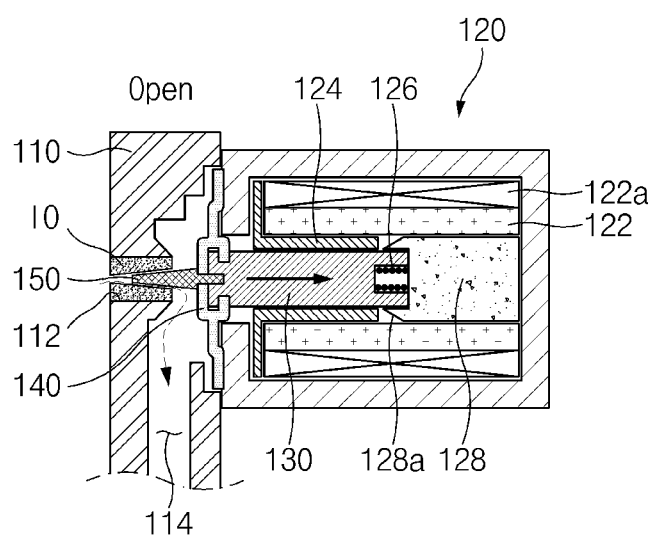
FIG. 3 is a cross-sectional view illustrating an example a state in which the plunger is moved to a second position in the valve device according to the implementation of the present disclosure.

On the contrary, when the plunger 130 moves to the second position (in a rightward direction based on FIG. 3) as illustrated in FIG. 3, the plunger 130 may move away from the discharge flow path 112 and open the discharge flow path 112.

The solenoid 120 is configured to provide driving power for rectilinearly moving the plunger 130.

The solenoid 120 may have various structures capable of providing driving power for rectilinearly moving the plunger 130. The present disclosure is not restricted or limited by the type and structure of the solenoid 120.

For example, the solenoid 120 may include: a bobbin 122 around which a coil 122a is wound; a yoke 124 provided in the bobbin 122 and configured to accommodate the plunger 130 such that the plunger 130 is rectilinearly movable; and an elastic member 126 configured to elastically support the rectilinear movement of the plunger 130 relative to the bobbin 122.

For example, the bobbin 122 may have a hollow cylindrical shape that surrounds the plunger 130. The coil 122a may be wound around the bobbin 122, and power may be applied to the coil 122a from a power supply unit.

The yoke 124 may have a hollow cylindrical shape and be disposed in the bobbin 122 while covering a part of an inner peripheral surface of the bobbin 122. The plunger 130 may be rectilinearly movably accommodated in the yoke 124.

The elastic member 126 is configured to elastically support the rectilinear movement of the plunger 130 relative to the bobbin 122.

Various spring members capable of elastically supporting the rectilinear movement of the plunger 130 relative to the bobbin 122 may be used as the elastic member 126. The present disclosure is not restricted or limited by the type and structure of the elastic member 126.

For example, a coil spring may be used as the elastic member 126. The elastic member 126 may provide an elastic force to allow the plunger 130 to move to the first position at which the plunger 130 closes the discharge flow path 112. For example, the elastic member 126 may be disposed between the plunger 130 and a core 128 to be described below.

For reference, because the implementation of the solenoid 120 according to the implementation of the present disclosure includes the bobbin 122, the yoke 124, and the elastic member 126 according to the well-known technology having the above-mentioned configuration and operational principle, a detailed description thereof will be omitted.

According to the exemplary implementation of the present disclosure, the valve device 100 may include the core 128 disposed in the bobbin 122 and facing the end of the plunger 130.

The core 128 is provided to ensure smoother movement of the plunger 130 relative to the solenoid 120.

The core 128 may be made of metal (e.g., iron) capable of forming a magnetic field. The present disclosure is not restricted or limited by the material and properties of the core 128.

As described above, in the implementation of the present disclosure, the core 128 may be provided at the end of the plunger 130. Therefore, when power is applied to the coil 122a, an additional magnetic field for moving the plunger 130 to the second position may be formed by the core 128. Therefore, it is possible to increase the magnetic field for moving the plunger 130 and ensure a smoother operation of the plunger 130 without increasing a size of the solenoid 120.

In particular, the valve device 100 may include an inclined recess 128a provided at an edge of an end (a left end based on FIG. 1) of the core 128 that faces the plunger 130.

For example, referring to FIG. 1, the inclined recess 128a may have a thickness that gradually increases in a direction from one end (a left end based on FIG. 1) adjacent to the plunger 130 to the other end (a right end based on FIG. 1).

As described above, in the implementation of the present disclosure, the inclined recess 128a may be provided at the end of the core 128 that faces the plunger 130. Therefore, when the plunger 130 initially moves from the first position at which the plunger 130 closes the discharge flow path 112 (a state in which the plunger 130 is maximally spaced apart from the core 128) to the second position, a largest magnetic field (magnetic force) may be applied to the plunger 130.

The anti-freezing member 150 is configured to prevent or otherwise reduce the freezing of the condensate water (target fluid) in the discharge flow path 112 by moving in the discharge flow path 112 in conjunction with the movement of the plunger 130.

That is, when the atmospheric temperature is lowered in the state in which the plunger 130 closes the discharge flow path 112 (the state in which the plunger 130 is disposed at the first position), the condensate water remaining in the discharge flow path 112 is frozen, and the discharge flow path 112 is clogged by ice IO formed in the discharge flow path 112. For this reason, there can be a problem in that the condensate water cannot be discharged to the outside even though the plunger 130 is moved to the second position at which the plunger 130 opens the discharge flow path 112.

However, in the implementation of the present disclosure, the anti-freezing member 150 connected to the plunger 130 may rectilinearly move along the discharge flow path 112 in conjunction with the movement of the plunger 130. Therefore, it is possible to ensure a discharge passageway (passing flow path) for discharging the condensate water in the discharge flow path 112 even though the condensate water remaining in the discharge flow path 112 is frozen.

According to the exemplary implementation of the present disclosure, when the plunger 130 is positioned at the first position, the anti-freezing member 150 may be disposed in the discharge flow path 112. In contrast, when the plunger 130 is moved from the first position to the second position, at least a part of the anti-freezing member 150 may be extended to the outside of the discharge flow path 112, such that a passing flow path (e.g., a gap between the ice and the anti-freezing member) through which the condensate water passes may be provided in the discharge flow path 112.

The anti-freezing member 150 may have various sizes (e.g., lengths) that enable the anti-freezing member 150 to move in the discharge flow path 112 in conjunction with the movement of the plunger 130. The present disclosure is not restricted or limited by the size of the anti-freezing member 150.

According to the exemplary implementation of the present disclosure, the discharge flow path 112 may have a first length L1, and the anti-freezing member 150 may have a second length L2 equal to or longer than the first length L1. When the plunger 130 moves to the first position (the position at which the plunger 130 closes the discharge flow path), the end (the left end based on FIG. 1) of the anti-freezing member 150 may be exposed to the outside of the discharge flow path 112. In particular, the anti-freezing member 150 may have the second length L2 longer than the first length L1.

As described above, the anti-freezing member 150 may have a length equal to or longer than the length of the discharge flow path 112, and the end of the anti-freezing member 150 may be exposed to the outside of the discharge flow path 112. Therefore, two opposite ends of a space in which the anti-freezing member 150 is positioned may be kept open even though the condensate water remaining in the discharge flow path 112 is frozen, which makes it possible to prevent the entire discharge flow path 112 from being clogged by the ice IO.

The anti-freezing member 150 may have various structures capable of forming the passing flow path in the discharge flow path 112. The present disclosure is not restricted or limited by the structure and shape of the anti-freezing member 150.

According to the exemplary implementation of the present disclosure, a proximal end (right end based on FIG. 1) of the anti-freezing member 150, which is adjacent to the plunger 130, may have a first cross-sectional area, and a distal end (left end based on FIG. 1) of the anti-freezing member 150 may have a second cross-sectional area different from the first cross-sectional area.

In this case, the configuration in which the proximal end and the distal end of the anti-freezing member 150 have different cross-sectional areas includes both a case in which the cross-sectional area (first cross-sectional area) of the proximal end of the anti-freezing member 150 is larger than the cross-sectional area (second cross-sectional area) of the distal end of the anti-freezing member 150 and a case in which the cross-sectional area (first cross-sectional area) of the proximal end of the anti-freezing member 150 is smaller than the cross-sectional area (second cross-sectional area) of the distal end of the anti-freezing member 150. For example, referring to FIGS. 1 to 3, the anti-freezing member 150 may have a kind of truncated conical shape having a cross-sectional area that gradually decreases in a direction from the proximal end to the distal end.

Figure 6:
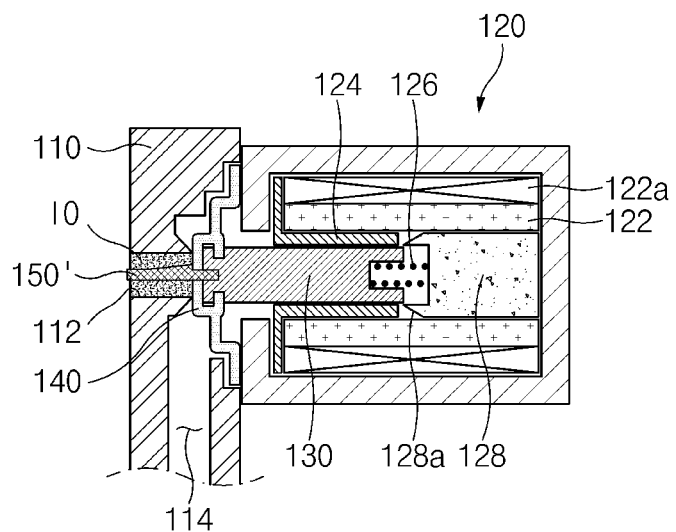
FIG. 6 is a cross-sectional view showing a modified example of an anti-freezing member in the valve device according to the implementation of the present disclosure.

In the implementation of the present disclosure illustrated and described above, the example has been described in which the anti-freezing member 150 has an approximately frustum shape (e.g., a truncated conical shape). However, according to another implementation of the present disclosure, an anti-freezing member 150' may have a wedge shape having a cross-sectional area that gradually decreases in a direction from the proximal end to the distal end as illustrated in FIG. 6.

Referring to FIG. 2, when the atmospheric temperature is lowered in the state in which the plunger 130 is disposed at the first position (the state in which the anti-freezing member is disposed in the discharge flow path 112), the ice IO may be formed in the discharge flow path 112 and surround the anti-freezing member 150.

Referring to FIG. 3, when the plunger 130 moves from the first position to the second position in the state in which the ice IO is formed in the discharge flow path 112, the anti-freezing member 150 may be moved together with the plunger 130 and extended to the outside of the discharge flow path 112 (moved rightward based on FIG. 3), such that the passing flow path through which the condensate water may pass may be defined in the gap between the ice IO and the anti-freezing member 150.

That is, because the anti-freezing member 150 has a cross-sectional area that gradually decreases in the direction from the proximal end to the distal end, a thin portion (distal end) of the anti-freezing member 150 may be positioned in the space corresponding to a thick portion (proximal end) of the anti-freezing member 150 when the plunger 130 moves from the first position to the second position. Therefore, the passing flow path through which the condensate water may pass may be provided in the gap between the ice IO and the anti-freezing member 150.

In the implementation of the present disclosure illustrated and described above, the example has been described in which the proximal end and the distal end of the anti-freezing member 150 have different thicknesses (cross-sectional areas). However, according to another implementation of the present disclosure, the entire anti-freezing member may have a constant thickness (cross-sectional area) in a longitudinal direction of the anti-freezing member (a rectilinear movement direction of the plunger). However, the anti-freezing member 150 may have a cross-sectional area that gradually decreases in the direction from the proximal end to the distal end in order to minimize an increase in movement stroke (movement distance) of the plunger 130.

The anti-freezing member 150 may be made of various materials in accordance with required conditions and design specifications. The present disclosure is not restricted or limited by the material of the anti-freezing member 150.

For example, the anti-freezing member 150 may be made of a material such as plastic, metal, or rubber. Alternatively, the anti-freezing member 150 may be made of different types of materials.

According to the exemplary implementation of the present disclosure, the valve device 100 may include a hydrophobic coating layer 156 provided on an outer surface of the anti-freezing member 150.

The hydrophobic coating layer 156 may be made of various materials such as polymer-based materials such as Teflon (PTFE) or PMMA, and polydimethylsiloxane (PDMS), and Pluronic (F127), that have hydrophobicity. The present disclosure is not restricted or limited by the material and properties of the hydrophobic coating layer 156.

As described above, the hydrophobic treatment may be performed (the hydrophobic coating layer may be formed) on the outer surface of the anti-freezing member 150 that comes into contact with the ice IO. Therefore, it is possible to minimize a situation in which the ice IO is attached to the outer surface of the anti-freezing member 150. Further, it is possible to obtain an advantageous effect of more easily separating the anti-freezing member 150 from the ice IO.

Figure 5:
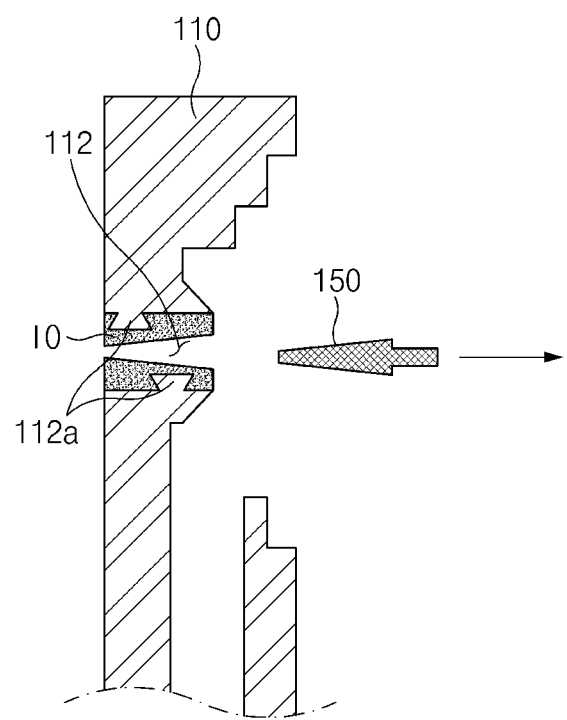
FIG. 5 is a cross-sectional view showing an example protrusion pattern in the valve device according to the implementation of the present disclosure.

Referring to FIG. 5, according to the exemplary implementation of the present disclosure, the valve device 100 may include a protrusion pattern 112a provided on an inner wall surface of the discharge flow path 112.

The protrusion pattern 112a may be variously changed in structure and shape in accordance with required conditions and design specifications. The present disclosure is not restricted or limited by the structure and shape of the protrusion pattern 112a.

For example, the protrusion pattern 112a may have an approximately trapezoidal cross-sectional shape. According to another implementation of the present disclosure, the protrusion pattern may have a semicircular shape, a triangular shape, or other shapes. Alternatively, a concave groove or hole may be formed in the inner wall surface of the discharge flow path instead of the protrusion pattern.

As described above, in the implementation of the present disclosure, the protrusion pattern 112a may be provided on the inner wall surface of the discharge flow path 112, such that the ice IO may be locked to the inner wall surface of the discharge flow path 112. Therefore, it is possible to obtain an advantageous effect of preventing the ice IO frozen in the discharge flow path 112 from being attached to the anti-freezing member 150 and moved together with the anti-freezing member 150 when the anti-freezing member 150 is extended to the outside of the discharge flow path 112 in conjunction with the movement of the plunger 130.

According to the exemplary implementation of the present disclosure, the valve device 100 may include a diaphragm 140 disposed between the plunger 130 and the discharge flow path 112.

The diaphragm 140 may be made of an elastic material (e.g., rubber or silicone) that enables the diaphragm 140 to be in close contact with the plunger 130 and the discharge flow path 112. The present disclosure is not restricted or limited by the material and properties of the diaphragm 140.

Because the diaphragm 140 is provided between the plunger 130 and the discharge flow path 112 as described above, it is possible to obtain an advantageous effect of improving sealability implemented by the plunger 130.

The diaphragm 140 may have various structures capable of being in close contact with the plunger 130 and the discharge flow path 112. The present disclosure is not restricted or limited by the structure of the diaphragm 140 and the connection structure.

For example, two opposite ends of the diaphragm 140 may be supported between the valve base 110 and a housing of the solenoid 120. An approximately central portion of the diaphragm 140 may move in the direction toward or away from the discharge flow path 112 in conjunction with the rectilinear movement of the plunger 130.

In particular, a locking protrusion may be provided on an inner surface of the diaphragm 140, and a locking groove configured to accommodate the locking protrusion may be provided at the end of the plunger 130, such that an arrangement state of the diaphragm 140 relative to the plunger 130 may be stably maintained. Alternatively, the diaphragm 140 may be attached to the end of the plunger 130 or locked in other ways.

For reference, in the implementation of the present disclosure illustrated and described above, the example has been described in which the diaphragm 140 is locked between the valve base 110 of the housing of the solenoid 120. However, according to another implementation of the present disclosure, the diaphragm may be locked (fastened) directly to the end of the plunger.

Meanwhile, the connection structure between the anti-freezing member 150 and the plunger 130 may be variously changed in accordance with required conditions and design specifications. The present disclosure is not restricted or limited by the connection structure between the anti-freezing member 150 and the plunger 130. Referring to FIGS. 1 to 3, according to the exemplary implementation of the present disclosure, the valve device 100 may include the diaphragm 140 disposed between the plunger 130 and the discharge flow path 112. The diaphragm 140 may have a through-hole 142, and one end of the anti-freezing member 150 may be connected (e.g., screw-fastened or coupled in an interference-fit manner) to the plunger 130 through the through-hole 142.

Figure 4:
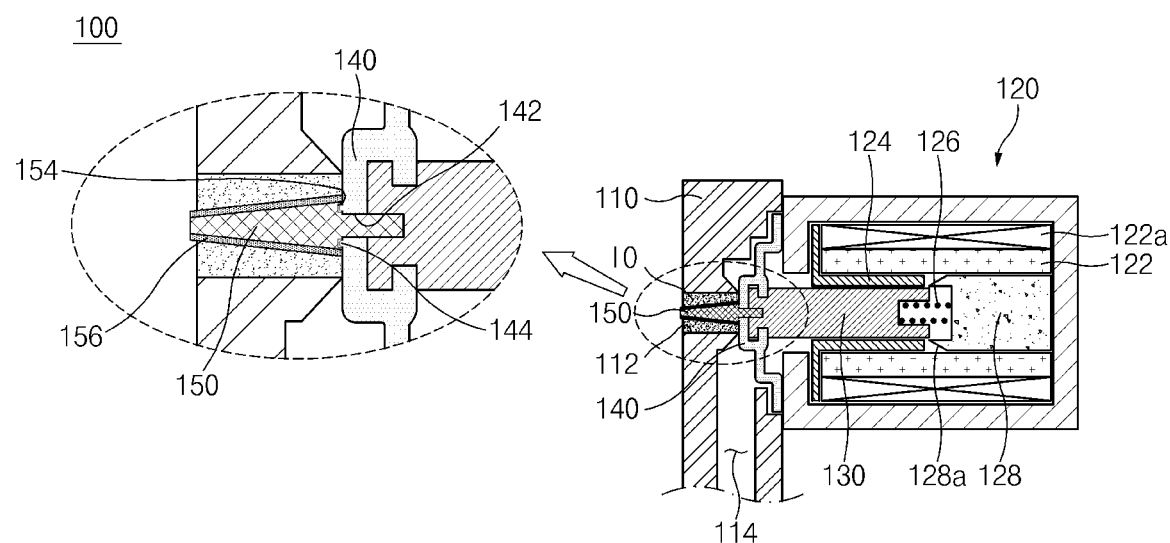
FIG. 4 is a cross-sectional view showing an example hydrophobic coating layer in the valve device according to the implementation of the present disclosure.

In particular, referring to FIG. 4, according to the exemplary implementation of the present disclosure, the valve device 100 may include: a sealing protrusion 144 configured to surround the through-hole 142 and provided on an outer surface of the diaphragm 140 that faces the discharge flow path 112; and a protrusion accommodation portion 154 provided on the anti-freezing member 150 and configured to accommodate the sealing protrusion 144.

For example, the sealing protrusion 144 may have an approximately ring shape that surrounds the through-hole 142. The sealing protrusion 144 may be compressed in a state of being accommodated in the protrusion accommodation portion 154. As described above, the sealing protrusion 144 may be accommodated in the protrusion accommodation portion 154 in the state in which the anti-freezing member 150 passes through the through-hole 142 and is then connected to the plunger 130. Therefore, it is possible to obtain an advantageous effect of more effectively preventing a leak of the condensate water through the gap between the through-hole 142 and the anti-freezing member 150.

Figure 7:
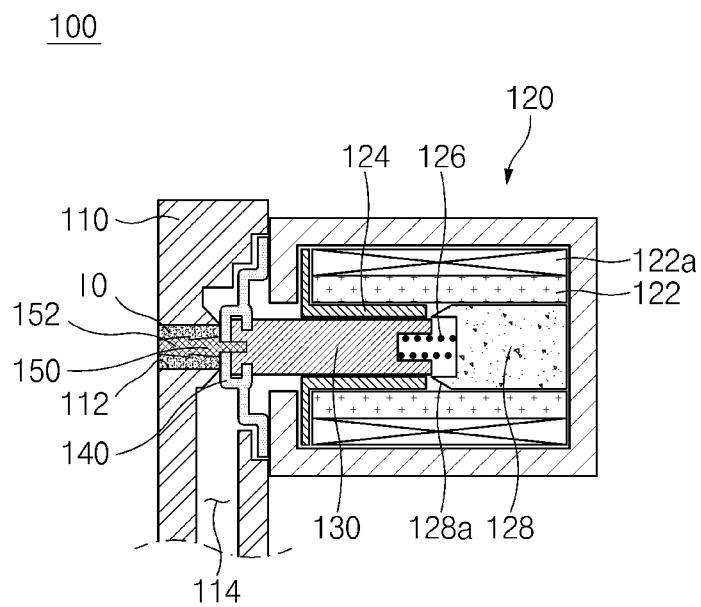
FIGS. 7 to 9 are example cross-sectional views illustrating ice crushing portions in the valve device according to the implementation of the present disclosure.
Figure 8:
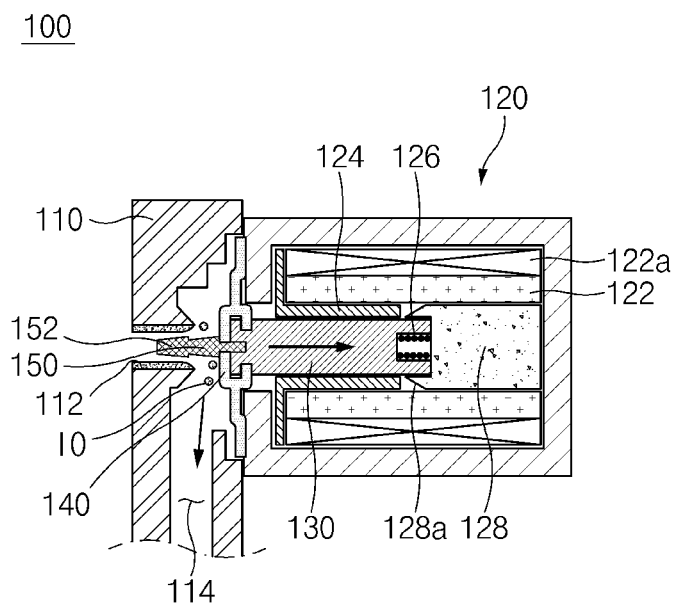
Figure 9:
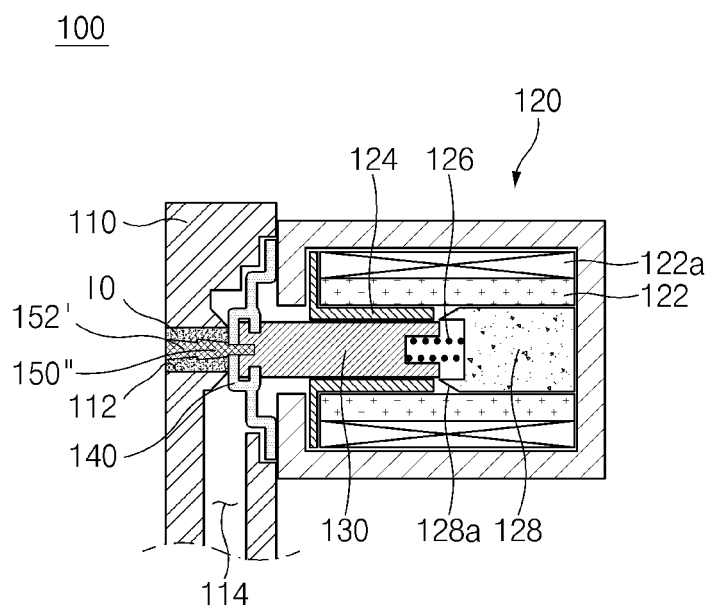

Referring to FIGS. 7 to 9, the valve device 100 according to the exemplary implementation of the present disclosure may include an ice crushing portion 152 or 152' connected to the distal end of the anti-freezing member 150 or 150" and having a cross-sectional area different from the second cross-sectional area (the cross-sectional area of the distal end of the anti-freezing member).

In this case, the configuration in which the ice crushing portion 152 or 152' has the cross-sectional area different from the cross-sectional area of the distal end of the anti-freezing member 150 or 150" includes both a case in which the cross-sectional area of the ice crushing portion 152 or 152' is larger than the cross-sectional area of the distal end of the anti-freezing member 150 or 150" and a case in which the cross-sectional area of the ice crushing portion 152 or 152' is smaller than the cross-sectional area of the distal end of the anti-freezing member 150 or 150".

The ice crushing portion 152 or 152' may have various structures capable of crushing the ice IO formed in the discharge flow path 112. The present disclosure is not restricted or limited by the structure of the ice crushing portion 152 or 152'.

For example, referring to FIGS. 7 and 8, the anti-freezing member 150 may have an approximately truncated conical (or wedge) shape having a cross-sectional area that gradually decreases in the direction from the proximal end adjacent to the plunger 130 to the distal end. The ice crushing portion 152 may have an approximately truncated conical (or wedge) shape having a cross-sectional area that gradually decreases in the direction from the proximal end adjacent to the anti-freezing member 150 to the distal end. The anti-freezing member 150 and the ice crushing portion 152 may be continuously connected to collectively define an approximately straight serrated shape.

For reference, in the implementation of the present disclosure, the example has been described in which the anti-freezing member 150 and the ice crushing portion 152 have the structures corresponding to each other. However, according to another implementation of the present disclosure, the anti-freezing member and the ice crushing portion may have different structures.

As described above, the ice crushing portion 152 provided at the end of the anti-freezing member 150 may crush the ice IO frozen in the discharge flow path 112 (e.g., crush the ice frozen at a downstream side of the ice crushing portion based on a direction in which the condensate water is discharged) when the anti-freezing member 150 and the ice crushing portion 152 move in conjunction with the rectilinear movement of the plunger 130 (the rectilinear movement from the first position to the second position). Therefore, it is possible to define the passing flow path further enlarged in the discharge flow path 112.

Meanwhile, in the implementation of the present disclosure illustrated and described above, the example has been described in which the anti-freezing member 150 has a cross-sectional area that gradually decreases in the direction from the proximal end to the distal end. However, according to another implementation of the present disclosure, the anti-freezing member may have a cross-sectional area that gradually increases in the direction from the proximal end to the distal end.

Referring to FIG. 9, according to the implementation of the present disclosure, the anti-freezing member 150" may have a kind of truncated conical (or wedge) shape having a cross-sectional area that gradually increases in the direction from the proximal end (the right end based on FIG. 9) adjacent to the plunger 130 to the distal end (the left end based on FIG. 9).

Because the distal end of the anti-freezing member 150" is thicker than the proximal end of the anti-freezing member 150" as described above, the ice IO frozen in the discharge flow path 112 may be crushed when the anti-freezing member 150" moves in conjunction with the rectilinear movement of the plunger 130 (the rectilinear movement from the first position to the second position). Therefore, it is possible to define the passing flow path further enlarged in the discharge flow path 112.

In addition, referring to FIG. 9, the ice crushing portion 152' may be provided at the distal end of the anti-freezing member 150" even in the structure in which the distal end of the anti-freezing member 150" is thicker than the proximal end of the anti-freezing member 150".

For example, the ice crushing portion 152' may be connected to the distal end of the anti-freezing member 150" and have an approximately truncated conical (or wedge) shape having a cross-sectional area that gradually increases in the direction from the proximal end adjacent to the anti-freezing member 150" to the distal end. The anti-freezing member 150" and the ice crushing portion 152' may be continuously connected to collectively define an approximately straight serrated shape.

Figure 10:
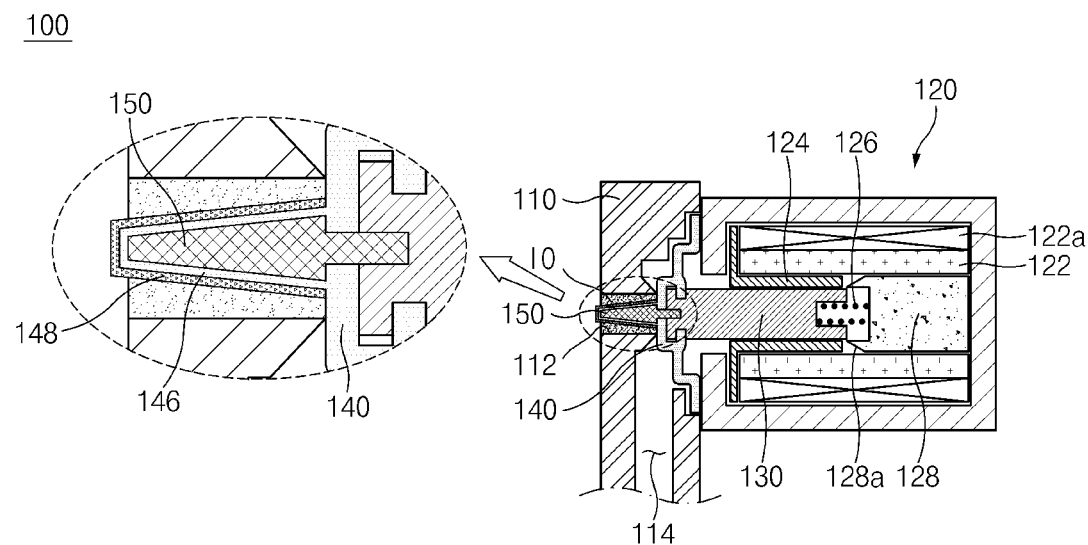
FIGS. 10 and 11 are cross-sectional views showing an example diaphragm cover in the valve device according to the implementation of the present disclosure.
Figure 11:
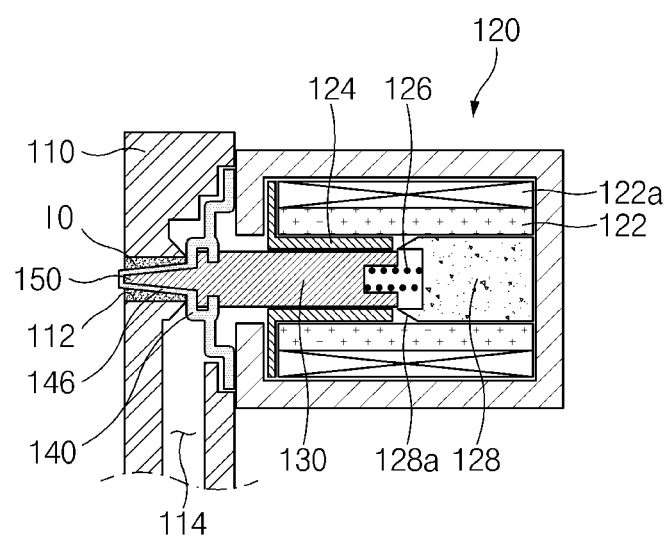

Referring to FIGS. 10 and 11, according to the exemplary implementation of the present disclosure, the valve device 100 may include a diaphragm cover 146 integrated with the diaphragm 140 and configured to surround the entire outer surface of the anti-freezing member 150.

For example, the diaphragm cover 146 may be integrally connected to the outer surface of the diaphragm 140 and surround the entire outer surface of the anti-freezing member 150.

Because the diaphragm cover 146 is provided to surround the outer surface of the anti-freezing member 150 as described above, it is possible to minimize a situation in which the ice IO is attached to the outer surface of the anti-freezing member 150. Further, it is possible to obtain an advantageous effect of easily separating the anti-freezing member 150 from the ice IO.

In addition, referring to FIG. 10, according to the exemplary implementation of the present disclosure, the valve device 100 may include a cover hydrophobic coating layer 148 provided on the outer surface of the diaphragm cover 146.

The cover hydrophobic coating layer 148 may be made of various materials such as polymer-based materials such as Teflon (PTFE) or PMMA, and polydimethylsiloxane (PDMS) and Pluronic (F127) that have hydrophobicity. The present disclosure is not restricted or limited by the material and properties of the cover hydrophobic coating layer 148.

As described above, in the implementation of the present disclosure, the cover hydrophobic coating layer 148 may be provided on the outer surface of the diaphragm cover 146 that comes into contact with the ice IO. Therefore, it is possible to obtain an advantageous effect of more effectively preventing the ice IO from being attached to the outer surface of the diaphragm cover 146, and of more easily separating the anti-freezing member 150 from the ice IO.

In the implementation of the present disclosure illustrated and described above, the example has been described in which the anti-freezing member 150 provided separately from the plunger 130 is coupled to the end of the plunger 130. However, according to another implementation of the present disclosure, the anti-freezing member 150 may be integrated with the plunger 130.

Referring to FIG. 11, according to the exemplary implementation of the present disclosure, the anti-freezing member 150 may be integrated with the end of the plunger 130 (e.g., integrated by injection molding) so that the anti-freezing member 150 and the plunger 130 define a unitary one-piece structure.

In addition, the diaphragm cover 146, which surrounds the entire outer surface of the anti-freezing member 150, may be provided on the outer surface of the diaphragm 140 even in the structure in which the anti-freezing member 150 is integrated with the end of the plunger 130.

Meanwhile, in the implementation of the present disclosure illustrated and described above, the example has been described in which the diaphragm and the anti-freezing member are separately manufactured. However, according to another implementation of the present disclosure, the diaphragm and the anti-freezing member may be configured as a unitary one-piece structure.

Figure 12:
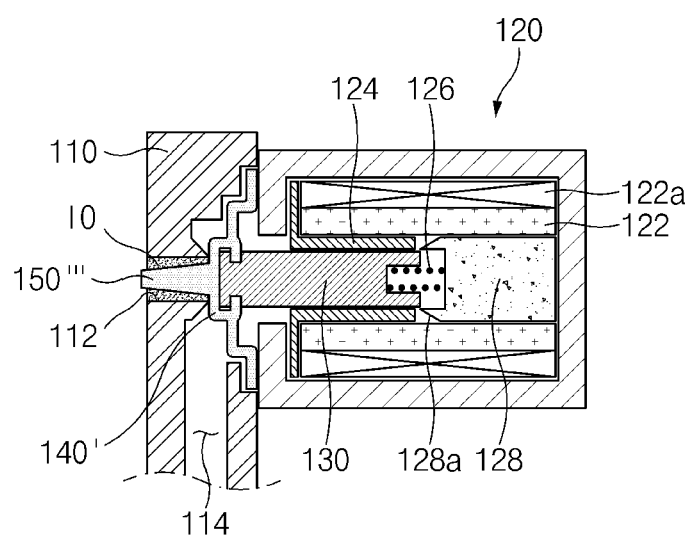
FIG. 12 is a cross-sectional view showing a modified example of the diaphragm in the valve device according to the implementation of the present disclosure.

Referring to FIG. 12, a diaphragm 140' and an anti-freezing member 150' may be collectively configured as a unitary one-piece structure.

As an example, the diaphragm 140' and the anti-freezing member 150' may be configured as a unitary one-piece structure by injection molding. For example, the diaphragm 140' and the anti-freezing member 150' may be configured as a unitary one-piece structure made of an elastic material such as rubber or silicone.

According to the implementation of the present disclosure described above, it is possible to obtain an advantageous effect of preventing the discharge flow path from being clogged, and of improving safety and reliability.

In particular, according to the implementation of the present disclosure, it is possible to obtain an advantageous effect of preventing the discharge flow path from being clogged by frozen discharge water. Further, it is possible to obtain an advantageous effect of discharging, in a timely manner, the discharge water and the exhaust gas generated from the fuel cell stack regardless of an outside temperature.

In addition, according to the implementation of the present disclosure, it is possible to obtain an advantageous effect of opening the discharge flow path, automatically solving a problem caused by the frozen discharge flow path, and preventing a situation in which the target fluid cannot be discharged because of the frozen target fluid.

In addition, according to the implementation of the present disclosure, it is possible to simplify the structure and the manufacturing process and reduce the costs.

In addition, according to the implementation of the present disclosure, it is possible to effectively solve a problem of the clogged discharge flow path without using a separate heating means and a separate power source.

In addition, according to the implementation of the present disclosure, it is possible to obtain an advantageous effect of contributing to the miniaturization of the product and improving the spatial utilization and the degree of design freedom.

While the implementations have been described above, the implementations are just illustrative and not intended to limit the present disclosure. It can be appreciated by those skilled in the art that various modifications and applications, which are not described above, may be made to the present implementation without departing from the intrinsic features of the present implementation. For example, the respective constituent elements specifically described in the implementations may be modified and then carried out. Further, it should be interpreted that the differences related to the modifications and applications are included in the scope of the present disclosure defined by the appended claims.

What is claimed is:

1. A valve device comprising:
    a valve base having a discharge flow path configured to discharge a target fluid therethrough, wherein the target fluid includes discharge water and exhaust gas that are produced during operation of a fuel cell stack;
    a plunger configured to be rectilinearly movable from a first position at which the plunger closes the discharge flow path to a second position at which the plunger opens the discharge flow path;
    a solenoid configured to provide driving power for moving the plunger;
    an anti-freezing member connected to the plunger and configured to restrict freezing of the target fluid in the discharge flow path by moving in the discharge flow path based on a movement of the plunger; and
    a hydrophobic coating layer provided at an outer surface of the anti-freezing member,
    wherein a distal end of the anti-freezing member passes through the hydrophobic coating layer, and a distal end surface of the distal end is exposed to an outside of the hydrophobic coating layer and configured to be exposed to an outside of the valve base.

2. The valve device of claim 1, wherein when the plunger is positioned at the first position, the anti-freezing member is disposed in the discharge flow path, and
    wherein when the plunger is moved from the first position to the second position, (i) at least a part of the anti-freezing member is extended to an outside of the discharge flow path, and (ii) a passing flow path through which the target fluid passes is provided in the discharge flow path.

3. The valve device of claim 1, wherein the discharge flow path has a first length, and the anti-freezing member has a second length equal to or greater than the first length, and
    wherein when the plunger is moved to the first position, the distal end of the anti-freezing member is exposed to an outside of the discharge flow path.

4. The valve device of claim 1, wherein a proximal end of the anti-freezing member adjacent to the plunger has a first cross-sectional area, and the distal end of the anti-freezing member has a second cross-sectional area different from the first cross-sectional area.

5. The valve device of claim 4, wherein the anti-freezing member has a cross-sectional area that decreases in a direction from the proximal end to the distal end.

6. The valve device of claim 1, further comprising:
    a diaphragm provided between the plunger and the discharge flow path.

7. The valve device of claim 6, wherein the diaphragm defines a through-hole, and one end of the anti-freezing member is connected to the plunger through the through-hole.

8. The valve device of claim 7, further comprising:
    a sealing protrusion configured to surround the through-hole and provided on an outer surface of the diaphragm that faces the discharge flow path; and
    a protrusion accommodation portion provided on the anti-freezing member and configured to accommodate the sealing protrusion.

9. The valve device of claim 1, wherein the solenoid comprises:
    a bobbin around which a coil is wound;
    a yoke disposed in the bobbin and configured to accommodate the plunger such that the plunger is rectilinearly movable; and
    an elastic member configured to elastically support a rectilinear movement of the plunger relative to the bobbin.

10. The valve device of claim 9, further comprising:
    a core disposed in the bobbin and facing an end of the plunger.

11. The valve device of claim 10, further comprising:
    an inclined recess provided at an end of the core that faces the plunger.

* * * * *